US011200890B2

(12) United States Patent
Dunning et al.

(10) Patent No.: US 11,200,890 B2
(45) Date of Patent: Dec. 14, 2021

(54) DISTINGUISHING VOICE COMMANDS

(71) Applicant: International Business Machines Corporation, Armonk, NY (US)

(72) Inventors: Jack Dunning, Lyndhurst (GB); Daniel T. Cunnington, Winchester (GB); Eunjin Lee, Eastleigh (GB); Giacomo G. Chiarella, Eastleigh (GB); John J. Wood, St. Albans (GB)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 15/968,320

(22) Filed: May 1, 2018

(65) Prior Publication Data

US 2019/0341034 A1 Nov. 7, 2019

(51) Int. Cl.
*G10L 15/22* (2006.01)
*G10L 25/84* (2013.01)
(Continued)

(52) U.S. Cl.
CPC .............. *G10L 15/22* (2013.01); *G10L 15/02* (2013.01); *G10L 15/26* (2013.01); *G10L 25/51* (2013.01);
(Continued)

(58) Field of Classification Search
CPC ... G10L 15/22; G10L 2015/223; G10L 15/20; G10L 15/02; G10L 15/30; G10L 17/005;
(Continued)

(56) References Cited

U.S. PATENT DOCUMENTS 6,324,499 B1   11/2001  Lewis et al.
7,810,144 B2   10/2010  Haff et al.
(Continued)

FOREIGN PATENT DOCUMENTS

CN    108107403 A    6/2018
CN    109286832 A    1/2019
(Continued)

OTHER PUBLICATIONS

Gibbs, M., "Amazon Echo: Wow!", Network World, Sep. 11, 2015, pp. 1-4. https://www.networkworld.com/article/2983632/cloud-computing/amazon-echo-wow.html.
(Continued)

*Primary Examiner* — Mark Villena
(74) *Attorney, Agent, or Firm* — James L. Olsen

(57) ABSTRACT

Aspects of the present disclosure relate to distinguishing voice commands. One or more stored blocked directions of background voice noise from one or more audio output devices for a location of a voice command device are accessed. A voice input is received at the voice command device at the location and a determination is made that the voice input is received from a blocked direction. A status of an audio output device is queried to determine whether it is emitting audio. In response to a determination that the audio output device is currently emitting audio, an audio file is obtained from the audio output device, the audio file corresponding to a time when the voice input was received. The obtained audio file is compared with the received voice input. The received voice input is ignored if there is a substantial match with the obtained audio file.

20 Claims, 10 Drawing Sheets

(51) Int. Cl.
*G10L 15/02* (2006.01)
*G10L 15/26* (2006.01)
*G10L 25/51* (2013.01)

(52) U.S. Cl.
CPC ........ *G10L 25/84* (2013.01); *G10L 2015/223* (2013.01)

(58) Field of Classification Search
CPC ........... G10L 17/04; G10L 2021/02087; G10L 2021/02166; G10L 21/028; G10L 25/30
See application file for complete search history.

(56) References Cited

U.S. PATENT DOCUMENTS

| | | | |
|---|---|---|---|
| 9,215,527 B1* | 12/2015 | Saric | H04R 3/005 |
| 9,304,736 B1 | 4/2016 | Whiteley et al. | |
| 9,384,751 B2 | 7/2016 | Venkatesha et al. | |
| 9,413,868 B2 | 8/2016 | Cronin | |
| 9,431,029 B2* | 8/2016 | Yook | G10L 25/78 |
| 9,443,010 B1 | 9/2016 | Sundeby et al. | |
| 9,548,053 B1 | 1/2017 | Basye et al. | |
| 9,571,490 B2 | 2/2017 | Fu et al. | |
| 9,607,612 B2 | 3/2017 | Deleeuw | |
| 9,633,661 B1* | 4/2017 | Typrin | G10L 17/22 |
| 9,728,188 B1* | 8/2017 | Rosen | G10L 15/22 |
| 9,734,845 B1 | 8/2017 | Liu et al. | |
| 9,818,425 B1 | 11/2017 | Rapetian et al. | |
| 9,820,036 B1 | 11/2017 | Tritschler et al. | |
| 9,972,339 B1* | 5/2018 | Sundaram | G10L 17/04 |
| 10,074,364 B1* | 9/2018 | Wightman | G10L 17/04 |
| 10,079,026 B1 | 9/2018 | Ebenezer | |
| 10,152,966 B1 | 12/2018 | O'Malley et al. | |
| 10,586,534 B1* | 3/2020 | Argyropoulos | G10L 15/22 |
| 2008/0294439 A1 | 11/2008 | Kirby | |
| 2009/0299752 A1 | 12/2009 | Rodriguez et al. | |
| 2010/0179811 A1 | 7/2010 | Gupta et al. | |
| 2010/0211387 A1* | 8/2010 | Chen | G10L 25/78 704/226 |
| 2011/0191097 A1 | 8/2011 | Spears | |
| 2012/0114138 A1 | 5/2012 | Hyun | |
| 2014/0122059 A1 | 5/2014 | Patel et al. | |
| 2014/0201639 A1 | 7/2014 | Savolainen et al. | |
| 2014/0207450 A1 | 7/2014 | LaVoie et al. | |
| 2014/0257812 A1 | 9/2014 | Mozer | |
| 2014/0270219 A1 | 9/2014 | Yu et al. | |
| 2014/0274218 A1 | 9/2014 | Kadiwala et al. | |
| 2014/0278367 A1 | 9/2014 | Markman et al. | |
| 2014/0350935 A1 | 11/2014 | Schuster et al. | |
| 2015/0006176 A1* | 1/2015 | Pogue | G10L 15/22 704/249 |
| 2015/0172814 A1* | 6/2015 | Usher | H04R 3/005 381/92 |
| 2015/0254955 A1 | 9/2015 | Fields et al. | |
| 2015/0279366 A1 | 10/2015 | Krestnikov et al. | |
| 2016/0005394 A1 | 1/2016 | Hiroe | |
| 2016/0027440 A1 | 1/2016 | Gelfenbeyn et al. | |
| 2016/0284350 A1 | 9/2016 | Yun et al. | |
| 2017/0061953 A1 | 3/2017 | An et al. | |
| 2017/0125037 A1 | 5/2017 | Shin | |
| 2017/0169818 A1 | 6/2017 | VanBlon et al. | |
| 2017/0193180 A1* | 7/2017 | Kusens | G06F 19/3418 |
| 2018/0018964 A1* | 1/2018 | Reilly | G10L 15/22 |
| 2018/0047394 A1 | 2/2018 | Tian et al. | |
| 2018/0068671 A1 | 3/2018 | Fawaz et al. | |
| 2018/0129796 A1 | 5/2018 | Oswal et al. | |
| 2018/0268808 A1 | 9/2018 | Song | |
| 2018/0324518 A1 | 11/2018 | Dusan et al. | |
| 2018/0332389 A1 | 11/2018 | Ekkizogloy et al. | |
| 2019/0098399 A1 | 3/2019 | Lashkar | |
| 2019/0115018 A1* | 4/2019 | Zurek | G10L 15/22 |
| 2019/0115019 A1* | 4/2019 | Zurek | G10L 15/22 |
| 2019/0132694 A1* | 5/2019 | Hanes | H04R 1/342 |
| 2019/0206395 A1 | 7/2019 | Aoki | |
| 2019/0207777 A1 | 7/2019 | Patel et al. | |
| 2019/0221210 A1 | 7/2019 | Song | |
| 2019/0250881 A1* | 8/2019 | Lee | G10L 17/22 |
| 2019/0311719 A1* | 10/2019 | Adams | G10L 15/22 |
| 2019/0320260 A1* | 10/2019 | Alders | G10L 21/0232 |

FOREIGN PATENT DOCUMENTS

| | | |
|---|---|---|
| CN | 109308908 A | 2/2019 |
| WO | 2017173141 A1 | 10/2017 |

OTHER PUBLICATIONS

"Change the Wake Word," Amazon.com Help, printed Jan. 15, 2018, 2 pages. https://www.amazon.com/gp/help/customer/display.html?nodeId=201971890&language=en_US.

Nichols, S., "TV anchor says live on-air 'Alexa, order me a dollhouse—guess what happens next," The Register, Jan. 7, 2017, 5 pages. https://www.theregister.co.uk/2017/01/07/tv_anchor_says_alexa_buy_me_a_dollhouse_and_she_does/.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

Islam et al., "SoundSifter: Mitigating Overhearing of Continuous Listening Devices," MobiSys '17: Proceedings of the 15th Annual International Conference on Mobile Systems, Applications, and Services, Jun. 2017, pp. 29-41, ACM. DOI: 10.1145/3081333.3081338.

"Dynamic time warping," Wikipedia, printed: Mar. 29, 2018, pp. 1-6. https://en.wikipedia.org/wiki/Dynamic_time_warping.

"Damerau-Levenshtein distance," Wikipedia, printed: Mar. 29, 2018, pp. 1-6. https://en.wikipedia.org/wiki/Damerau%E2%80%93Levenshtein_distance.

"How to detect how similar a speech recording is to another speech recording," stack overflow, Questions, posted:Jun. 2013, printed: Mar. 29, 2018, pp. 1-12. https://stackoverflow.com/questions/17010516/how-to-detect-how-similar-a-speech-recording-is-to-another-speech-recording.

Samarawickrama, L., "Comparing two audio files with Fast Fourier Transformation (FFT)," Lahiru'S TraverSAL—Tech Blog, Feb. 28, 2015, pp. 1-2. https://lstsal.wordpress.com/2015/02/28/comparing-two-audio-files/.

"IPA Phonetic Transcription of English Text | toPhonetics," printed: Mar. 29, 2018, pp. 1-2. http://lingorado.com/ipa/.

Vincent, J., "Inaudible ultrasound commands can be used to secretly control Siri, Alexa, and Google Now," The Verge, Sep. 7, 2017, pp. 1-6. https://www.theverge.com/2017/9/7/16265906/ultrasound-hack-siri-alexa-google.

Lee et al., "Voice Command Filtering," U.S. Appl. No. 15/896,323, filed Feb. 14, 2018.

Lee et al., "Ignoring Trigger Words in Streamed Media Content," U.S. Appl. No. 15/968,349, filed May 1, 2018.

List of IBM Patents or Patent Application Treated as Related, Signed May 1, 2018, 2 pages.

Lee et al., "Distinguishing Voice Commands", U.S. Appl. No. 16/545,462, filed Aug. 20, 2019.

IBM, List of IBM Patents or Patent Applications Treated as Related, Aug. 20, 2019, 2 pages.

Lee et al., "Ignoring Trigger Words in Streamed Media Content", Application No. 201910358068. X, Filed Apr. 30, 2019.

Notification of Transmittal of the International Search Report and the Written Opinion of the International Searching Authority, or the Declaration, dated Nov. 30, 2020, 9 pages.

Hurwitz et al., "Keyword Spotting for Google Assistant Using Contextual Speech Recognition", 2017, pp. 272-278.

* cited by examiner

DISTINGUISHING VOICE COMMANDS

BACKGROUND

The present disclosure relates to voice command devices, and more specifically, to voice command filtering.

Voice command devices (VCD) are controlled by human voice commands. Devices are controlled by human voice commands to remove the need to operate a device using hand controls such as buttons, dials, switches, user interfaces, etc. This enables a user to operate devices whilst their hands are occupied with other tasks or if they are not close enough to the device to touch it.

VCDs may take various form including devices with a dedicated use such as home appliances, controllers for other devices, or personal assistants. VCDs in the form of virtual personal assistants may be integrated in computing devices such as smart phones. Virtual personal assistants may include voice activated instructions for performing tasks or services in response to voice commands and inputs.

VCDs may be activated by a voice command in the form of one or more trigger words. VCDs may use voice recognition to be programmed only to respond to a registered individual's voice or a group of registered individual's voices. This prevents non-registered users from giving commands. Other types of VCD are not tuned to registered users and allow any user to give a command in the form of designated command words and instructions.

SUMMARY

Embodiments of the present disclosure include a method, computer program product, and system for distinguishing voice commands at a voice command device. One or more stored blocked directions of background voice noise from one or more audio output devices for a location of a voice command device can be accessed. A voice input can be received at the voice command device at the location and a determination can be made that the voice input is received from a blocked direction. A status of an audio output device can be queried to determine whether it is emitting audio. In response to a determination that the audio output device is currently emitting audio, an audio file can be obtained from the audio output device, the audio file corresponding to a time when the voice input was received. The obtained audio file can be compared with the received voice input. The received voice input can be ignored if there is a substantial match with the obtained audio file.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
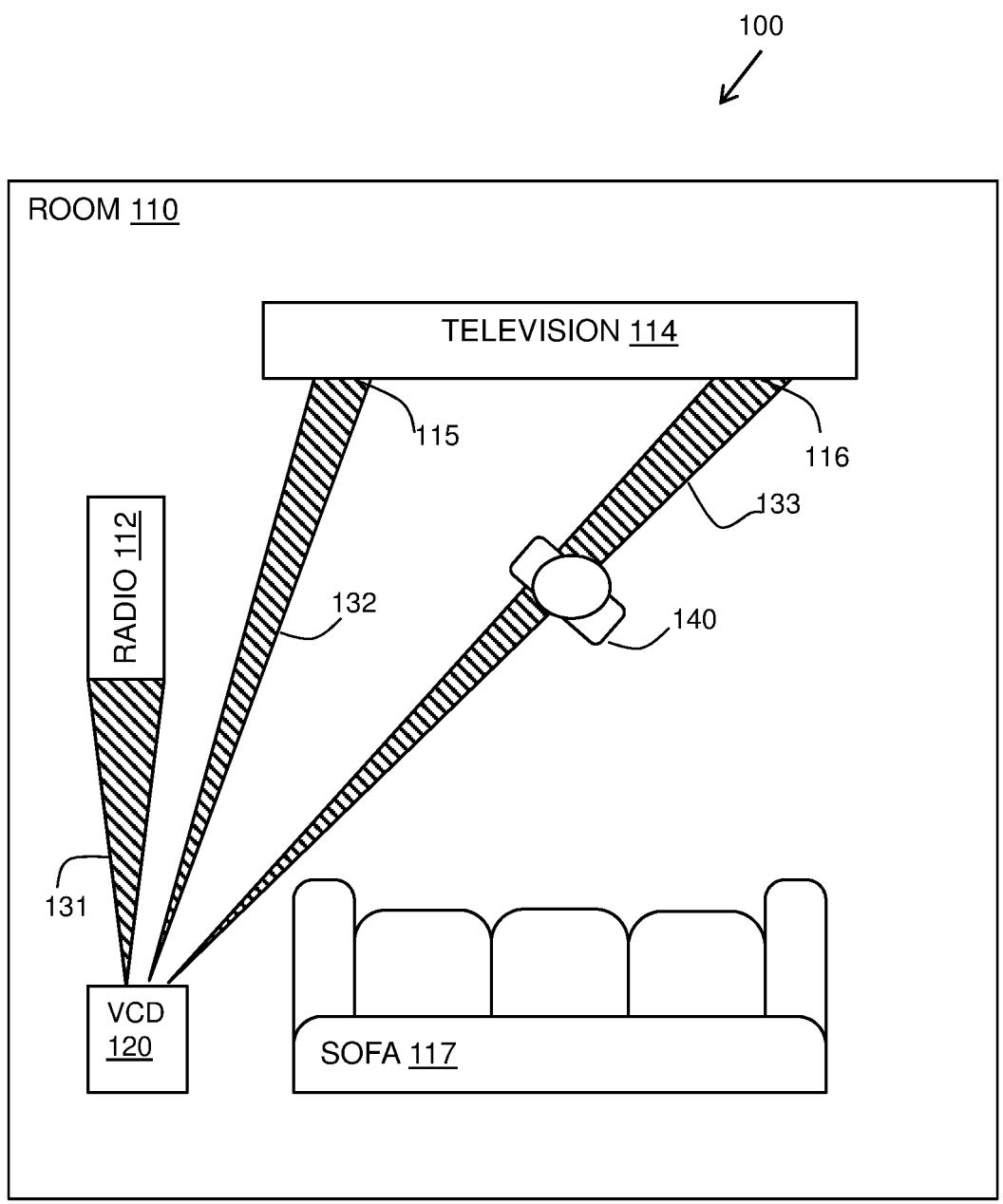
FIG. 1 is a schematic diagram illustrating an environment in which embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field voice command devices, and in particular to voice command filtering. While the present disclosure is not necessarily limited to such applications, various aspects of the disclosure may be appreciated through a discussion of various examples using this context.

Voice command devices (VCD) are controlled by human voice commands. Devices are controlled by human voice commands to remove the need to operate a device using hand controls such as buttons, dials, switches, user interfaces, etc. This enables a user to operate devices whilst their hands are occupied with other tasks or if they are not close enough to the device to touch it.

Complications arise when a VCD is triggered by a voice command from a television, radio, computer, or other non-human device that emits a voice in the vicinity of the VCD. For example, a VCD in the form of a smart speaker incorporating a voice-controlled intelligent personal assistant may be provided in a living room. The smart speaker may erroneously respond to audio from a television. Sometimes this may be a benign command that the smart speaker does not understand; however, occasionally the audio is a valid command or trigger word that may result in an action by the intelligent personal assistant.

Aspects of the present disclosure are directed to distinguishing voice commands at a voice command device. If, over time, an audio output device (e.g., television) is emitting background noise, the audio output device may be added to a blocked direction such that the VCD does not trigger in response to audio output by the background noise. The voice command device may be configured to recognize registered users' from the blocked direction such that the registered users' commands are executed from the blocked direction. However, if an unregistered user attempts to issue commands from the blocked direction (e.g., by the television), the unregistered user may be erroneously ignored. Accordingly, aspects of the present disclosure overcome the aforementioned complications by querying the audio output device (e.g., television) to determine whether it is emitting audio. If the audio output device is not outputting audio at the time the command was issued, the unregistered user's command can be processed. If the audio output device is outputting audio at the time the command was issued, an audio file can be collected from the audio output device and compared to the received voice command. If the voice command and audio file substantially match, then the command can be ignored (e.g., as it was likely received from the television). If the voice command and audio file do not substantially match, then the voice command can be processed, as it was not originating from the audio output device.

Referring now to FIG. 1, a schematic diagram 100 shows a room 110 in which a voice command device (VCD) 120 may be regularly positioned. For example, the VCD 120 may be in the form of a smart speaker including a voice-controlled intelligent personal assistant that is located on a table next to a sofa 117 in the room 110.

The room 110 may include a television 114 from which audio may be emitted from two speakers 115, 116 associated with the television 114. The room 110 may also include a radio 112 with a speaker.

The VCD 120 may, at various times, receive audio inputs from the two television speakers 115, 116 and the radio 112. These audio inputs may include voices that include command words that unintentionally trigger the VCD 120 or provide input to the VCD 120.

Aspects of the present disclosure provide added functionality to the VCD 120 to learn directions (e.g., relative angles) of audio inputs that should be ignored for a given location of the VCD 120.

Over time, the VCD 120 may learn to identify sources of background noise in a room 110 by the direction of their audio input to the VCD 120. In this example, the radio 120 is located at approximately 0 degrees in relation to the VCD 120 and a hashed triangle 131 illustrates how the audio output of the radio 112 may be received at the VCD 120. The two speakers 115, 116 of the television 114 may be detected as being located in directions of approximately 15-20 degrees and 40-45 degrees respectively and hashed triangles 132, 133 illustrates how the audio output of the speakers 115, 116 may be received at the VCD 120. Over time, these directions may be learned by the VCD 120 as blocked directions from which audio commands are to be ignored.

In another example, a VCD 120 may be a fixed appliance such as a washing machine and a blocked direction may be learned for a source of audio input such as a radio in the same room as the washing machine.

If the VCD 120 receives a command from these blocked directions, it may ignore the command unless it is configured to accept commands from these directions from a known registered user's voice.

In embodiments, the VCD 120 can be configured to distinguish between commands from an unknown person 140 speaking from a blocked direction (e.g., the direction of one of the audio speakers 115, 116 of the television 114 or the direction of the radio 112). As described further below, the VCD 120 can be configured to query the audio output device (e.g., the television 114 or radio 112) to ascertain the status of the audio device (e.g., whether the audio device is outputting audio). If the status of the audio device indicates that the audio device is not outputting audio, the command from the unknown person 140 can be executed, even if the unknown person is speaking from a blocked direction.

Embodiments enable a VCD 120 that is positioned in a given location (e.g., direction with respect to the VCD 120) to ignore unwanted sources of commands for that location whilst not missing commands from unknown users.

Figure 2A:
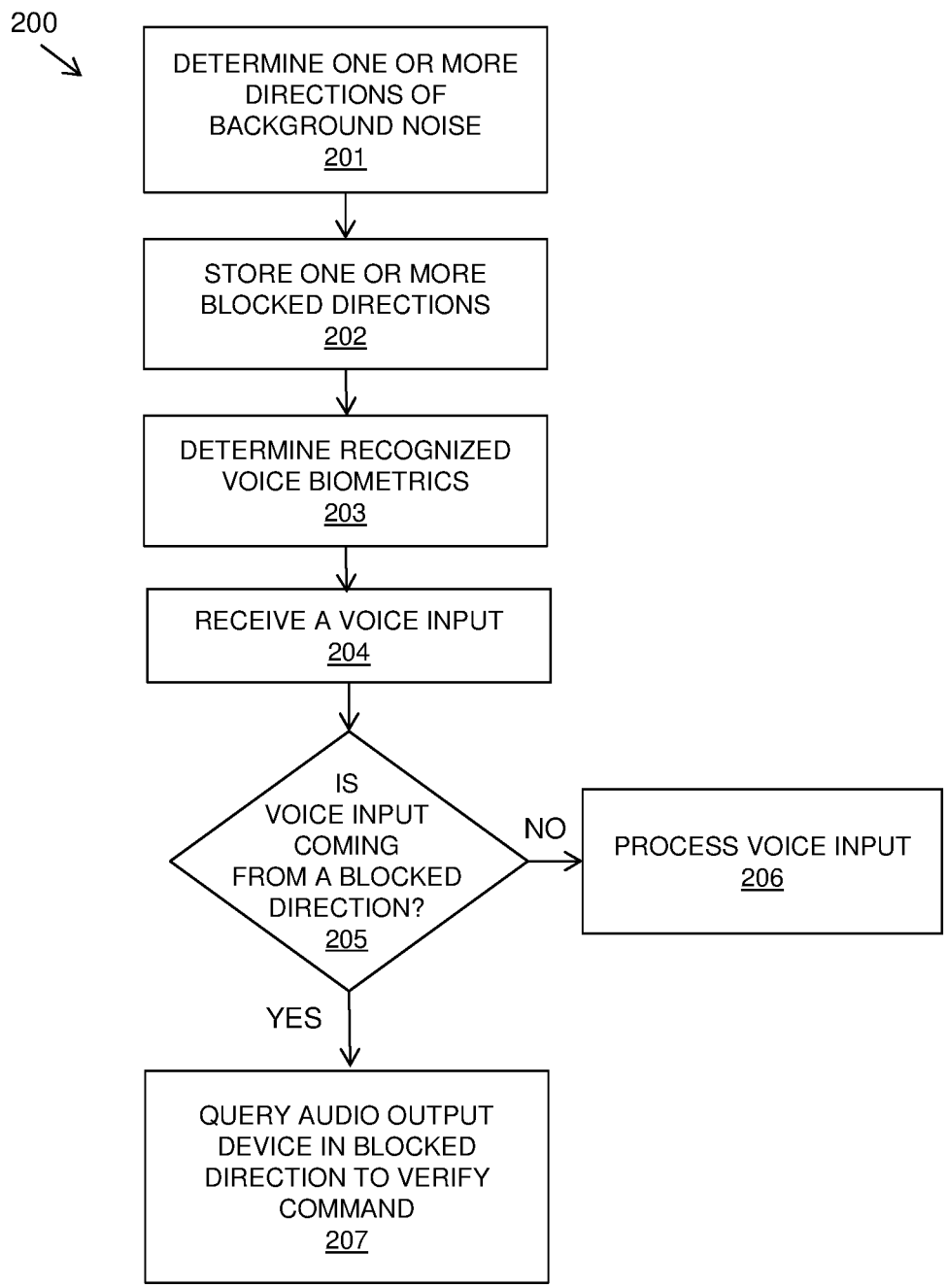
FIG. 2A is a flow diagram illustrating an example method for voice command filtering based on a blocked direction, in accordance with embodiments of the present disclosure.

FIG. 2A is a flow diagram illustrating an example method for voice command filtering based on a blocked direction, in accordance with embodiments of the present disclosure.

Process 200 begins by determining one or more directions of background voice noise. This is illustrated at step 201. The VCD 120 may learn the directions for the location by receiving background audio inputs from these directions, and analyzing the relative direction in which the audio inputs are received from, which may include both voice and non-voice background noises. In some embodiments, determining the one or more directions of background noise is completed by triangulation (e.g., by measuring the audio input at two or more known locations (e.g., microphones mounted in the VCD 120) and determining the direction and/or location of the audio input by measuring the angles from the known points). Triangulation can be completed by including two or more microphones in the VCD 120 and cross referencing the audio data received at the two or more microphones. In some embodiments, the one or more blocked directions can be determined by time difference of arrival (TDOA). This method can similarly utilize two or more microphones. The data received at the two or more microphones can be analyzed to determine a location of the received audio input based on the difference of arrival of the audio input. In some embodiments, the one or more blocked directions can be determined by associating sensors (e.g., optical sensors, GPS sensors, RFID tags, etc.) with speakers in the room (e.g., speakers 112, 115, and 116 of FIG. 1) and using the sensors to determine the blocked direction. For example, optical sensors can be associated with the VCD 120 and one or more speakers in the room. The blocked directions can then be determined by the optical sensor associated with the VCD 120. Alternatively, directions of background voice noise may be configured by a user.

The one or more blocked directions are then stored. This is illustrated at step 202. The one or more blocked directions can be stored in any suitable memory (e.g., flash memory, RAM, hard disk memory, etc.). In some embodiments, the one or more blocked directions are stored on local memory on the VCD 120. In some embodiments, the one or more blocked directions can be transmitted over a network and stored on another machine.

In addition, the VCD 120 determines recognized voice biometrics. This is illustrated at step 203. Determining recognized voice biometrics can be completed by, for example, applying voice recognition for one or more registered voices. The voice recognition may utilize characteristics of the voice such as pitch and tone. The recognized voice biometrics can be stored on the VCD 120 to determine whether incoming voices are registered with the VCD 120. This can be accomplished by comparing the incoming voices to the recognized voice biometrics to determine whether the incoming voice is a recognized voice.

A voice input is then received. This is illustrated at step 204. The voice input can be received by a human or non-human entity. Accordingly, the term "voice input" does not necessarily have to be a voice, but can rather include background noise (e.g., such as a running laundry machine, music from a speaker, etc.).

A determination is then made whether the voice input is coming from a blocked direction. This is illustrated at step 205. Determining whether the voice input is coming from a blocked direction can be completed by comparing the stored blocked directions to the direction the voice input was received from to determine if the received voice input is associated with a stored blocked direction. If the voice input is coming from a direction which differs from the stored blocked directions, then a determination can be made that the voice input is not coming from a blocked direction.

If a determination is made that the voice input is not coming from a blocked direction, then the voice input is processed. This is illustrated at step 206. In some embodiments, processing includes identifying a command and executing the received command. In some embodiments, processing can include comparing the received voice input to stored command data (e.g., data that specifies command words and command initiation protocols) to determine whether the received voice input corresponds to (e.g., matches) a command of the stored command data. For example, if the voice input includes the phrase "Power Off", and "Power Off" is specified as a command initiation phrase in the stored command data, then a determination can be made that the voice input is a command and the command can be executed (e.g., the power can be turned off).

If a determination is made that the voice input is received from a blocked direction, an audio device associated with the blocked direction can be queried to verify the voice input. This is illustrated at step 207. For example, referring to FIG. 1, if an audio input is received from speaker 116, the television 114 can be queried to determine whether the television is off or muted. If a determination is made that the television is off or muted (not emitting audio), the voice input can be processed (e.g., a voice command can be executed), as the audio input was received from the unknown user 140.

Figure 2B:
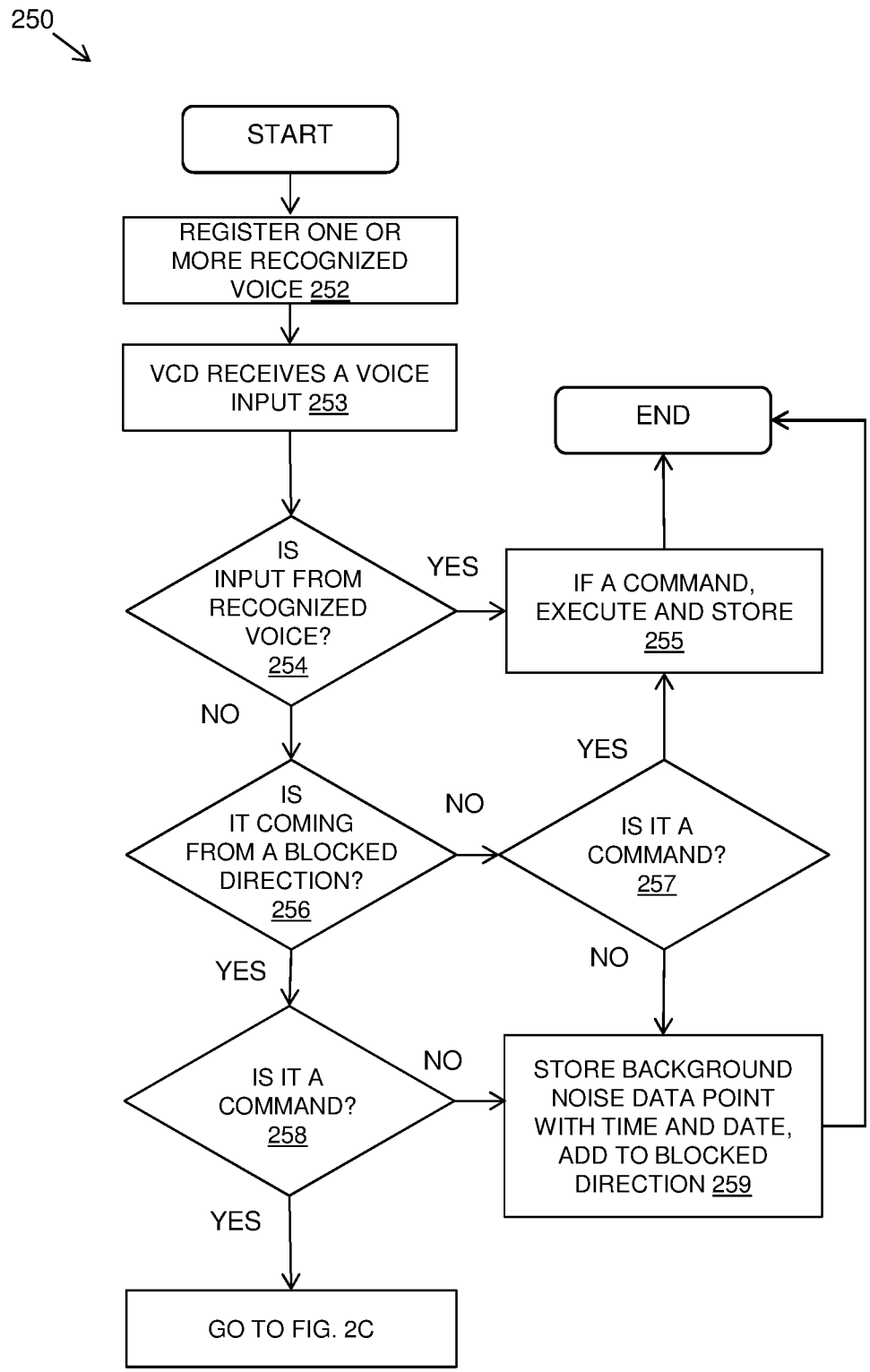
FIG. 2B is a flow diagram illustrating example method for determining whether to execute voice commands, in accordance with embodiments of the present disclosure.
Figure 2C:
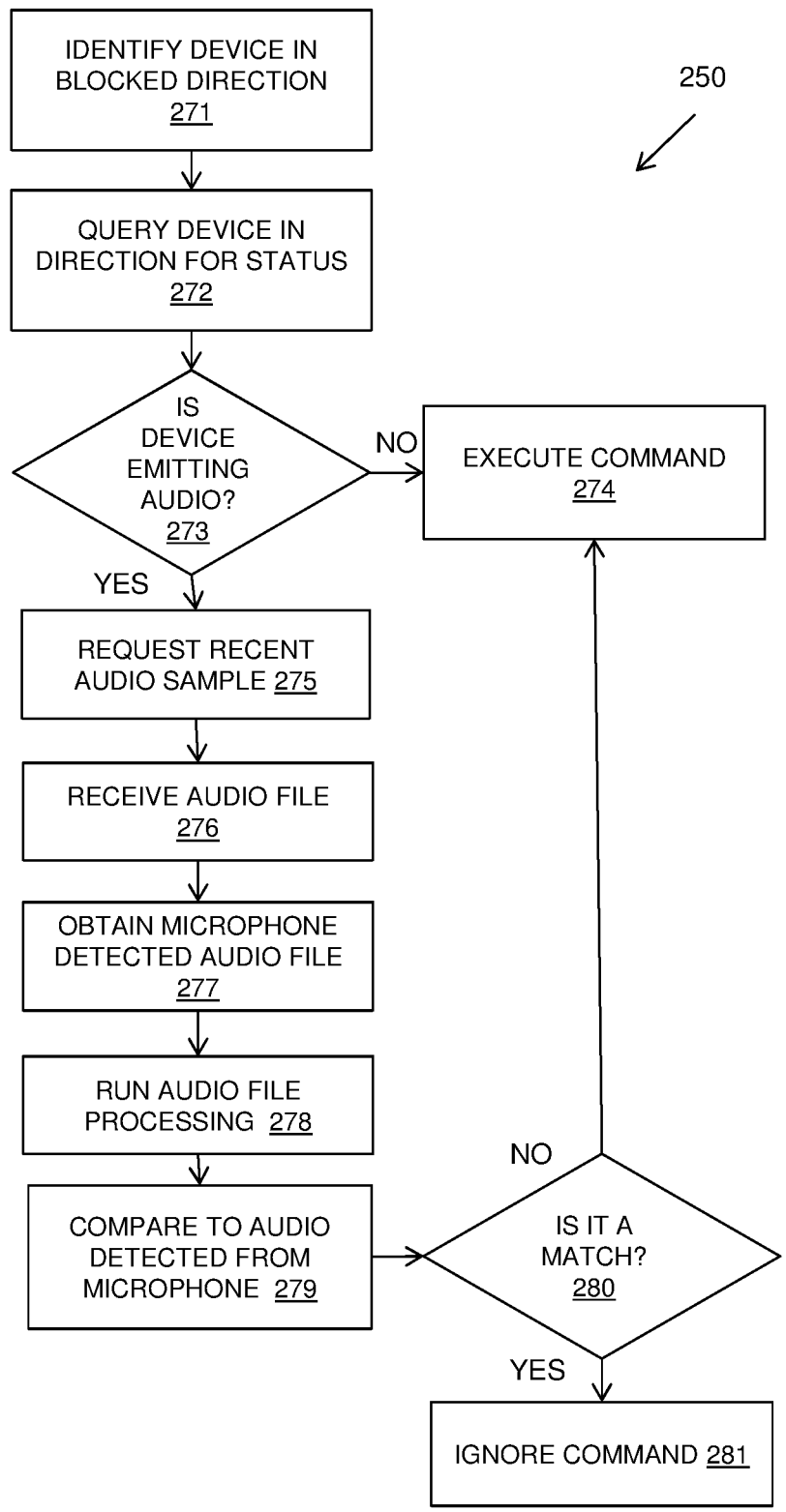
FIG. 2C is a flow diagram illustrating an example method for querying an audio output device to determine whether a voice command should be ignored, in accordance with embodiments of the present disclosure.

FIGS. 2B-2C are flow diagrams collectively illustrating a process 250 for filtering audio voice data received by a voice command device (e.g., VCD 120), in accordance with embodiments of the present disclosure. FIG. 2B is a flow diagram illustrating example method for determining whether to execute voice commands based on direction and recognized voice biometrics, in accordance with embodiments of the present disclosure. FIG. 2C is a flow diagram illustrating an example method for querying an audio output device to determine whether a voice command should be ignored, in accordance with embodiments of the present disclosure.

Process 250 starts where one or more recognized voices are registered on the VCD. This is illustrated at step 252. For example, the VCD may be configured to register a primary user of the VCD to ensure the voice biometrics of the voice are easily recognized. The voice registration can be completed by analyzing various voice inputs from a primary user. The analyzed voice inputs can then be used to distinguish a tone and pitch for the primary user. Alternatively, regularly received voices may be automatically learned and registered by recording pitch and tonal data received during the use of the device. Having voice recognition functionality may not exclude commands or inputs from other non-registered voices from being accepted by the VCD. In some embodiments, no voices may be registered and the method may block directions for all voice inputs.

A voice input is then received. This is illustrated at step 253. In some embodiments, non-voice inputs are automatically filtered, which may be an inherent functionality to a VCD. In some embodiments, voice inputs may include background noise voices or strings (e.g., which include non-human voice inputs).

A determination is then made whether the voice input is associated with a recognized voice. This is illustrated at step 254. Determining whether the voice input is associated with a recognized voice can be completed by analyzing the voice biometrics of the received voice input (e.g., by completing a tone and pitch analysis of the received voice input) and comparing the analyzed voice input data to the registered voice biometrics.

If the voice input is associated with a recognized voice, and the voice input is a command, the command is executed. This is illustrated at step 255. This enables the VCD to respond to voice inputs from registered users regardless of the direction from which the voice input is received including if it is received from a blocked direction. The method may store a data point of a valid command for learning purposes including, optionally storing the time at which and direction from which the voice command was received. This may be used, for example, to learn common directions of valid commands, such as from a favorite position in relation to the VCD that may be boosted for more sensitive command recognition.

If the voice input is not from a recognized voice, a determination can be made whether the voice input is originating from a blocked direction. This is illustrated at step 256. Determining the direction of a voice input may include measuring the angle of the incoming voice input. VCDs may have known functionality for evaluating a direction of incoming sound. For example, multiple microphones may be positioned on the device and the detection of the sound across the multiple microphones may enable the position to be determined (e.g., using triangulation or time of arrival difference). A blocked direction may be stored as a range of angles of incidence of incoming sound to the receiver. In the case of multiple microphones, the blocked direction may correspond to voice inputs received predominantly or more strongly at one or more of the multiple microphones. The direction of the incoming sound may be determined in a three-dimensional arrangement with input directions determined from above or below as well as in a lateral direction around the VCD.

If the voice input is not from a blocked direction, a determination is made whether the voice input is a command. This is illustrated at step 257. If a determination is made that the voice input is a command, then the command may be executed at step 255. This enables a command to be executed from a non-registered voice, i.e. from a new or guest user and does not restrict the user of the VCD to registered users. In some embodiments, the command can be stored as a command data point including the direction from which the command was received. This may be analyzed for further voice registration, to determine if the command is overridden by a subsequent user input. The method may then end and await a further voice input (e.g., at step 253).

If a determination is made that the voice input is not from a blocked direction and is not a command, a determination is made that the audio input is a source of background noise. The background noise data is then stored with a time, date, and the direction (e.g., angle of incidence) the background noise was received from. This is illustrated at step 259. The direction can then be added as a blocked direction such that if voice inputs are repeatedly received from this direction they can be blocked. A threshold can be implemented to determine when a voice input received from a non-blocked direction that does not specify a command can be determined to be background noise.

For example, a plurality of voice inputs can be received from a particular direction. Each of the plurality of voice inputs can be received at a distinct time. The plurality of received voice inputs can be compared to stored command data to determine whether each of the plurality of received voices corresponds to the stored command data. The number of voice inputs of the plurality of voice inputs that do not correspond to the stored command data can be determined. The number of voice inputs that do not correspond to the stored command data can be compared to a non-command voice input threshold (e.g., a threshold that specifies a number of non-command voice inputs that can be received for a given direction before storing the given direction with the one or more blocked directions). In response to the number of voice inputs that do not correspond to the stored command data exceeding the non-command voice input threshold, the particular direction can be stored with the one or more blocked directions. In some embodiments, the background noise threshold includes sound characteristic information, such as frequency and amplitude.

If a determination is made that the voice input is coming from a blocked direction, a determination is made whether the voice input is a command. This is illustrated at step 258. If the voice input is coming from a blocked direction and is not a command, then the voice input is stored as a source of background noise. This is illustrated at step 259.

If a determination is made that the voice input coming from the blocked direction is a command, then process 250 proceeds to FIG. 2C, where one or more audio output devices in the blocked direction are identified. This is illustrated at step 271. A data store may be maintained by the VCD of blocked directions and the audio output devices in each blocked direction together with a communication channel or address for querying each audio output device. In some embodiments, the method may identify all audio output devices in the vicinity of the VCD and may use a blanket communication to communicate with all the audio output devices.

The one or more identified audio output devices are queried. This is illustrated at step 272. In embodiments in which there are multiple audio output devices in the blocked direction, multiple queries may be transmitted to two or more audio output devices simultaneously. Querying audio output device(s) can include transmitting a request signal to the devices to collect audio data associated with the devices. The audio output device(s) can be queried for volume status (e.g., whether the device(s) are muted or the current volume level) and power status (e.g., whether the device(s) are powered on). The status request can be transmitted using any suitable connection (e.g., intranet, internet, Bluetooth, etc.).

A determination is made whether the queried audio device is emitting audio. This is illustrated at step 273. Determining whether the audio output device is emitting audio is completed based on the audio output device's response to the query request. For example, if the response to the query request indicates that the audio output device is muted, a determination is made that the audio output device is not emitting audio at step 273. Similarly, if the response (or lack thereof) to the query request indicates the audio output device is off, a determination is made that the audio output device is not emitting audio. In some embodiments, the determination can be completed based on a volume level threshold. For example, if a volume level threshold is set to 50% volume, and the response to the query request indicates that the volume of the audio output device is 40%, a determination can be made that the audio output device is not emitting audio loud enough to trigger the VCD.

If a determination is made that the audio output device is not emitting audio (or the audio is too quiet to trigger the VCD based on a volume threshold), then the command is executed. This is illustrated at step 274. If a determination is made that the audio output device is outputting audio (or the audio is loud enough to trigger the VCD based on a volume threshold), then an audio sample is requested from the audio output device. This is illustrated at step 275. In some embodiments, the audio sample (e.g., audio file, audio snippet, etc.) corresponds to the point in time in which the VCD was triggered. For example, a 2-10 second audio sample encompassing the point in time in which the VCD was triggered can be requested. However, any suitable audio sample length can be requested (e.g., the past hour, day, or VCD power session).

The requested audio file is then received by the VCD. This is illustrated at step 276. Further, the microphone detected audio file obtained by the VCD is also obtained. This is illustrated at step 277. The audio files are then processed at step 278 for comparison. In some embodiments, processing can include cleaning up the audio files (e.g., removing static and background noise from the audio files). In some embodiments, processing can include truncating the audio files (e.g., the audio file from the audio output device and the audio file obtained from the VCD microphone) to a uniform length. In some embodiments, processing can include amplifying the audio files. In some embodiments, processing can include dynamically adjusting the timing of the audio files such that the words present in the audio files are aligned properly for comparison. However, the audio files can be processed in any other suitable manner at step 278. For example, in some embodiments, the audio files are converted into text (e.g., using convention speech-to-text conversion) such that the text between the audio files can be compared.

The audio file obtained from the audio output device and the audio file obtained at the VCD microphone are then compared. This is illustrated at step 279. In some embodiments, audio files are compared using a Fast Fourier Transformation (FFT). In embodiments in which the audio files are converted to text, the transcripts for each audio file can be compared to determine whether the strings in each transcript match. In some embodiments, the text transcripts may be converted to a phonetic representation to avoid false positives where words sound like a command but are actually different. Slight differences in the detection may be accounted for, using known string similarity and text comparison methods.

A determination is then made whether there is a match between the audio file received from the audio output device and the audio file obtained at the VCD microphone. This is illustrated at step 280. In embodiments, determining whether there is a match can be completed based on one or more thresholds. For example, if audio files are compared via FFT, there may be a match certainty threshold in order to determine whether the audio files substantially match. For example, if a match certainty threshold is set to 70%, if the FFT comparison indicates a 60% similarity, a determination can be made that the audio files do not substantially match. As another example, if a comparison indicates a 75% similarity, a determination can be made that the audio files do substantially match.

In embodiments in which audio files are converted into text and compared, the match certainty threshold can be based on the number of matching characters/words in the audio file transcripts. For example, a match certainty threshold can specify a first number of characters within each transcript that are required to match in order for the audio files to substantially match (e.g., 20 characters must match in order for the audio file for the voice command and audio output device to be determined to substantially match). As another example, a match certainty threshold can specify a number of words within each transcript that are required to match in order for the audio files to substantially match (e.g., 5 words must match in order for the audio file for the voice command and audio output device to be determined to substantially match).

If there is a match, the command has originated from the audio output device and may be ignored. This is illustrated at step 281. If there is not a match, the command may be processed and executed, as the sound has originated from a source other than the audio output device. This is illustrated at step 274.

If the command is ignored at step 281, the command may be stored as an ignored command data point with a timestamp of a time and date together with the received direction of the voice input. This data may be used for analysis of blocked directions. Further, this data may be used to analyze whether a device is still located at a blocked direction, by referencing the stored time and date of the background noise data points. A threshold number of non-identified voice commands may be stored from a given direction before adding the direction to the blocked directions.

The analysis of stored data points of valid voice commands, background noise inputs, and ignored or invalid commands recorded with the incoming directions may be carried out to learn blocked directions, and, optionally, common directions for valid commands. A periodic data cleanup (e.g., formatting and filtering) may be carried out at as a background process of the stored data points.

Data points may be stored to allow the method and system to identify more precisely directions in which noise should be ignored. Noise which is not from a recognized voice coming from a known blocked direction can be ignored regardless of whether it is a command or not.

Storing data points of different types of noise allows for further analysis of background noise and thus gives finer discrimination on which directions to block. For example, an oven beeping may be received by a VCD from the direction of the oven. Over time, the background noise data points may be analyzed to identify that the background noise data point in this direction has never included a command, or the background noise data points from a given direction are very similar in terms of the audio content. In this case, commands may be allowed from this direction.

The VCD may include a user input mechanism to override blocked direction inputs or to override execution of a command. The method may also learn from such override inputs from the user to improve on the performance.

This method assumes that the VCD stays in the same location in the same room, which is often the case. If the VCD is moved to a new location, it may relearn its environment to identify block directions for non-human sources in relation to the VCD at the new location. The method may store blocked directions in relation to a given location of the VCD so that the VCD may be returned to a previous location and reconfigure the blocked directions without relearning its environment.

In some embodiments, the method may allow configuration of known directions to be blocked. This may remove the need or be in addition to the learning of blocked directions over time and may enable a user to pre-set blocked directions from their knowledge of the directions from which interfering audio may be received.

The user may position the VCD at a location and the VCD may allow input to configure the blocked locations. This may be via a graphical user interface, via a remote programming service, etc. In one embodiment, the configuration of blocked directions may be carried out using voice commands by a user standing at an angle to be blocked (e.g., in front of a television) and commanding that direction to be blocked. In another embodiment, a pre-configuration of a room may be loaded and this may be stored for use if the VCD is moved.

Using the example shown in FIG. 1, the VCD 120 may start picking up commands from the television 114 and may store the direction of these incoming commands. The method may then filter out commands and background noise that are always issued from the same direction. Commands from that direction that are not in line with the voices that usually give commands from other directions will be ignored.

An advantage of the described method is that, unlike devices that block all commands that are not from a known user, the VCD may include an additional level of verification in the form of direction. When a new user arrives in the proximity of the VCD and issues a command, the VCD may still execute the command because it is coming from a direction which is not blocked due to association with static audio emitting objects.

The technical problem that is solved is enabling the device to identify that sounds are coming from other devices as opposed to human users. Further, the present disclosure provides a technical benefit in determining whether commands coming from a blocked direction are a result of an audio output device or a human, by querying the device for recent audio samples.

Figure 3:
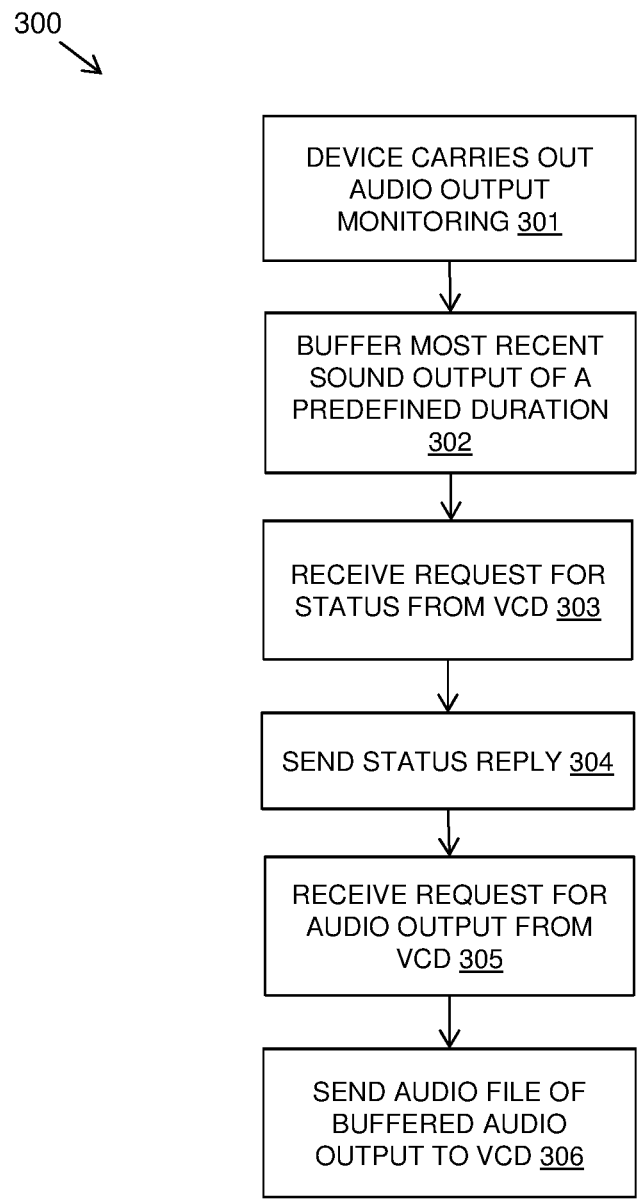
FIG. 3 is a flow diagram illustrating an example method for transmitting an audio file to a voice command device, in accordance with embodiments of the present disclosure.

FIG. 3 is a flow diagram illustrating an example method for transmitting an audio file to a voice command device, in accordance with embodiments of the present disclosure. Audio output devices that output sound, such as a television or radio, can include software components which allows them to communicate with a VCD on request (e.g., a smart speaker or smart television with network interface controllers (NICs). An audio output device may require a software update to include this functionality and the audio output device may also be required to be connected to the same network as the VCD, such as the user's home WiFi network.

Method 300 may initiate by an audio device carrying out audio output monitoring. This is illustrated at step 301. The audio output may be buffered for a predefined or configured duration. This is illustrated at step 302. For example, the audio output device can store the most recent 10 seconds, minute, 5 minutes, etc. of audio output.

The audio output device can receive a status request from the VCD. This is illustrated at step 303. The request may be the same or substantially similar to the request described with reference to step 275 of FIG. 2C. In embodiments, the request may query volume status and/or power status. The audio output device may acknowledge the request with a status reply. This is illustrated at step 304. The status reply can include volume status and/or power status data. If the VCD determines, based on the status reply, that the audio output device is outputting audio, a request for an audio output sample can be received from the VCD. This is illustrated at step 305. In some embodiments, if the audio output device is emitting audio, it may automatically transmit the most recently buffered audio output to the VCD in the form of an audio file. This is illustrated at step 306. In some embodiments, the audio output device may wait to receive the audio sample request from the VCD prior to transmitting the buffered audio file to the VCD.

Figure 4:
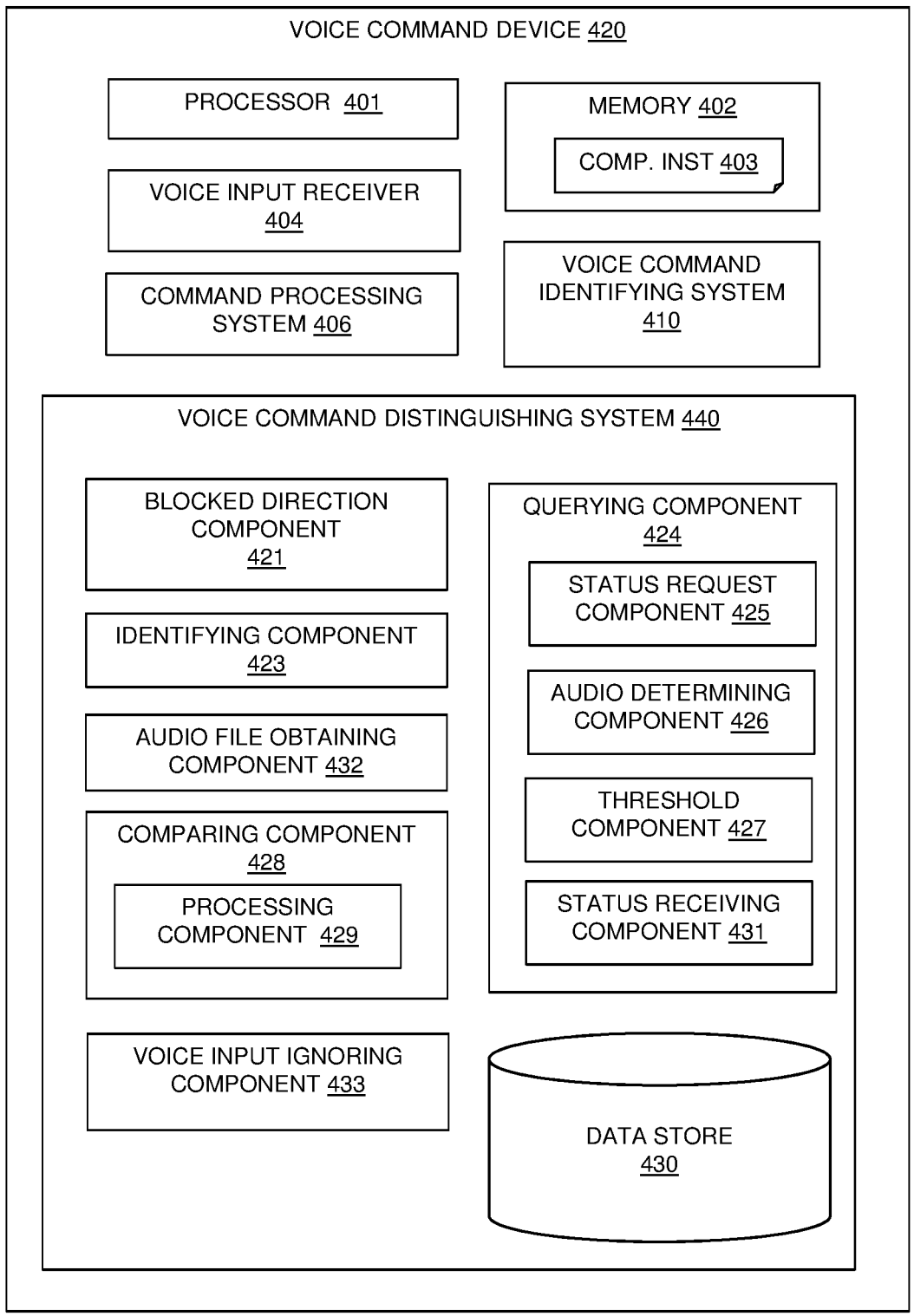
FIG. 4 is a block diagram of a voice command device, in accordance with embodiments of the present disclosure.

Referring to FIG. 4, shown is a block diagram of a VCD 420, in accordance with embodiments of the present disclosure. The VCD 420 may be the same as or substantially similar to the VCD 120 described in FIG. 1.

The VCD 420 may be a dedicated device or part of a multi-purpose computing device including at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The VCD 120 may include components for the known functionality of a VCD that are dependent on the type of device and known voice processing. In embodiments, the VCD 420 includes a voice input receiver 404 comprising multiple (e.g., two or more) microphones configured in an array to receive voice inputs from different directions relative to the VCD 420. This audio received at the multiple microphones of the voice input receiver 404 can be used to determine locations (e.g., directions) of incoming noise. This can be completed via triangulation or time of difference of arrival.

The VCD 420 may include a command processing system 406 in the form of existing software of the VCD for receiving and processing voice commands. In addition, a voice command identifying system 410 may be provided for determining directions to block and identifying commands from blocked directions. The VCD 420 may further include a voice command distinguishing system 440 configured to distinguish voice inputs from a known audio output device at a blocked direction from genuine voice input commands, which may be from an unknown or unregistered user.

The VCD software including voice command recognition processing may be provided locally to the VCD 420 or computing device or may be provided as a remote service over a network, for example as a cloud-based service. The voice command identifying system 410 and voice command distinguishing system 440 may be provided as downloadable updates at the VCD software or may be provided as individual add-on remote services over a network, for example as a cloud-based service. A remote service may also provide an application or application update for an audio output device to provide the described functionality at the audio output device.

The voice command distinguishing system 440 may include a blocked direction component 521 for accessing one or more stored blocked directions of background voice noise for a location of the VCD 420 as provided by the voice command identifying system 410. A data store 430 of blocked directions with associated audio output devices including stored communication channels for the audio output devices may be maintained by the voice command identifying system 410.

The voice input receiver may be configured to receive a voice input at the VCD 420 at the location and determining that the voice input is received from a blocked direction.

The voice command distinguishing system 520 may include an identifying component 423 for identifying an audio output device associated with the blocked direction by referencing the data store 530. The identifying component 423 can, via triangulation or time difference of arrival, determine devices located in blocked directions.

The voice command distinguishing system 440 may include a querying component 424 configured to query the status of an identified audio output device to determine if it is currently emitting audio output and, if it is currently emitting audio output, obtaining an audio file of a latest audio output from the audio output device. The querying component 424 includes a status request component 425 configured to request one or more statuses (e.g., volume or power statuses) from one or more devices. The querying component 424 further includes an audio determining component 426 to determine whether the queried audio device is emitting audio (e.g., based on the volume/power status). In some embodiments, the querying component includes a threshold component 427 which implements one or more thresholds to determine whether the audio output device is emitting audio. For example, the threshold component 427 may be configured to set a volume threshold for determining whether a device is emitting audio. The querying component can include a status receiving component 431 for receiving a status from an audio output device.

The querying component 424 may query the status of all audio output devices in a range of the voice command device to determine which of them is currently emitting audio output. The querying component 424 may obtain an audio file as buffered at the audio output device.

The voice command distinguishing system 440 may include an audio file receiving component 432 for receiving the audio file from the queried audio output device. The obtained audio file can be compared to the voice input received at the voice input receiver 404.

The voice command distinguishing system 440 may include a comparing component 428 for comparing the obtained audio file with the received voice input. The comparing component 428 may include a processing component 429 for processing the obtained audio file and the received voice input to convert the audio file and the voice input to text and to represent the text as phonetic strings for comparison. However, the processing component 429 can process the audio files in any other suitable manner (e.g., modifying the amplitude, length, etc. of the audio files).

The voice command distinguishing system 440 may include a voice input ignoring component 433 for ignoring the received voice input if there is a substantial match with the obtained audio file.

Figure 5:
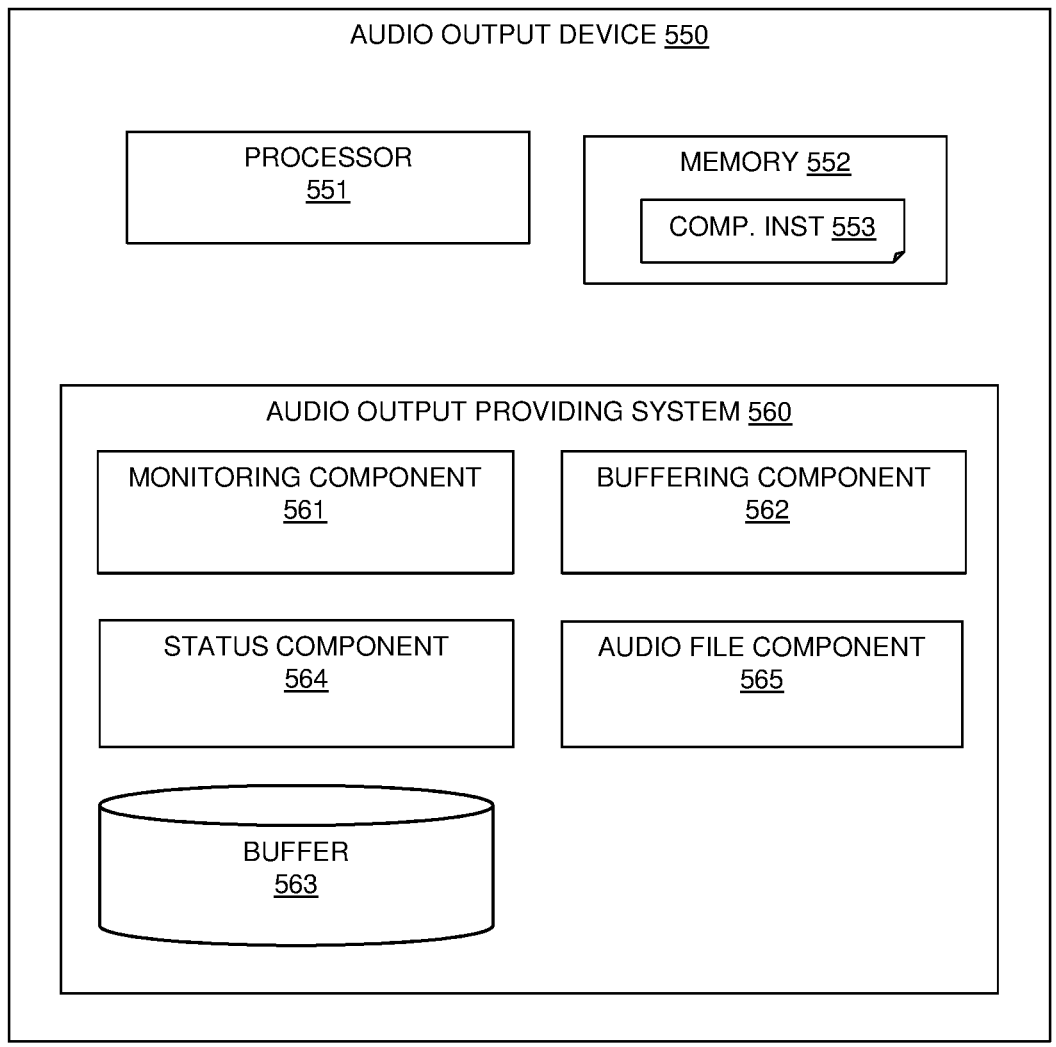
FIG. 5 is a block diagram of an audio output device, in accordance with embodiments of the present disclosure.

Referring to FIG. 5, shown is a block diagram of an example audio output device 550, in accordance with embodiments of the present disclosure. In embodiments, the audio output device 550 can be any suitable audio output device. For example, the audio output device can be the television 114 or radio 112 depicted in FIG. 1. However, the audio output device 550 can be a smart watch, mobile device, speaker, a voice command device, a computer system (e.g., a laptop, desktop, etc.) or any other suitable audio output device.

The audio output device 550 may be any form of device having audio output and having at least one processor 551, a hardware module, or a circuit for executing the functions of the described components which may be software units executing on the at least one processor. Multiple processors running parallel processing threads may be provided enabling parallel processing of some or all of the functions of the components. Memory 552 may be configured to provide computer instructions 553 to the at least one processor 551 to carry out the functionality of the components.

The audio output device 550 includes a software component in the form of an audio output providing system 560 which allows it to communicate with a VCD (e.g., VCD 120 or VCD 420) on request from the VCD. An audio output device 550 may require a software update to include this functionality and the audio output device 550 may also be required to be connected to the same network as the VCD, such as the user's home WiFi network.

The audio output providing component 560 may include a monitoring component 561 for monitoring an audio output of the audio output device 550 and a buffering component 562 for buffering a predefined duration of latest audio output in a buffer 563.

The audio output providing system 560 may include a status component 564 for sending a status reply to a querying VCD to determine if the audio output device 550 is currently emitting audio output.

The audio output providing system 560 may include an audio file component 565 for sending an audio file to the VCD if the audio output device is currently emitting audio output. The audio file that is sent can be a latest buffered audio output from the buffer 563 of the audio output device 550.

Figure 6:
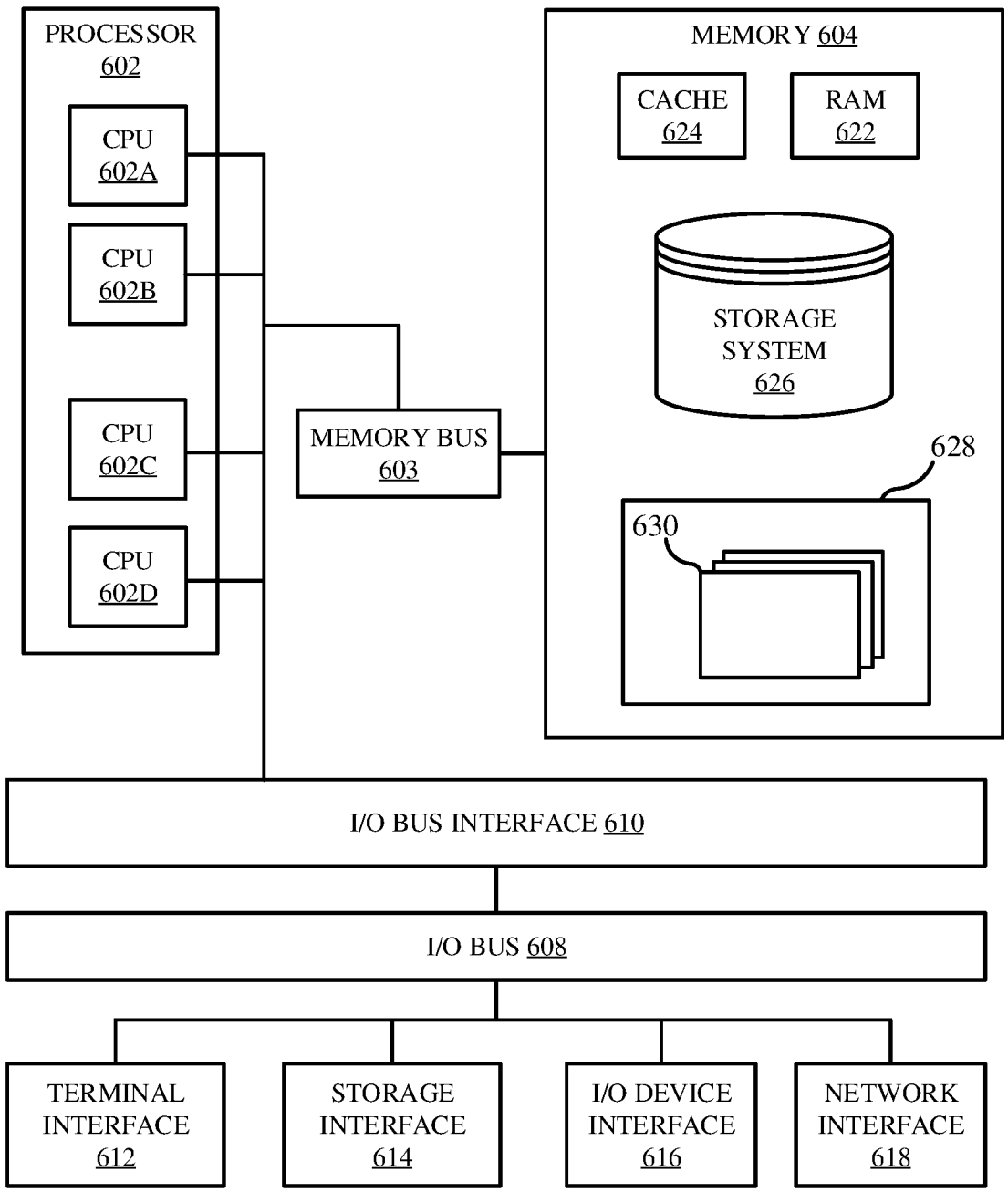
FIG. 6 is a high-level block diagram illustrating an example computer system that can be used in implementing one or more of the methods, tools, and modules, and any related functions, described herein, in accordance with embodiments of the present disclosure.

Referring now to FIG. 6, shown is a high-level block diagram of an example computer system 601 (e.g., VCD 120 of FIG. 1, VCD 420 of FIG. 4, audio output device 550 of FIG. 5) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

In some embodiments, the program modules 630 of the computer system 601 include a voice command distinguishing module. The voice command distinguishing module can be configured to access one or more blocked directions of background voice noise from one or more audio output devices. The voice command distinguishing module can further be configured to receive a voice input and determine whether it is received from a blocked direction. The voice command distinguishing module can be configured to query the status of an audio device to determine whether it is emitting audio. In response to a determination that the audio output device is emitting audio, the voice command distinguishing module can be configured to collect an audio sample from the audio output device. The voice distinguishing module can then compare the audio sample and the voice command and ignore the voice command if the audio sample and voice command substantially match.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
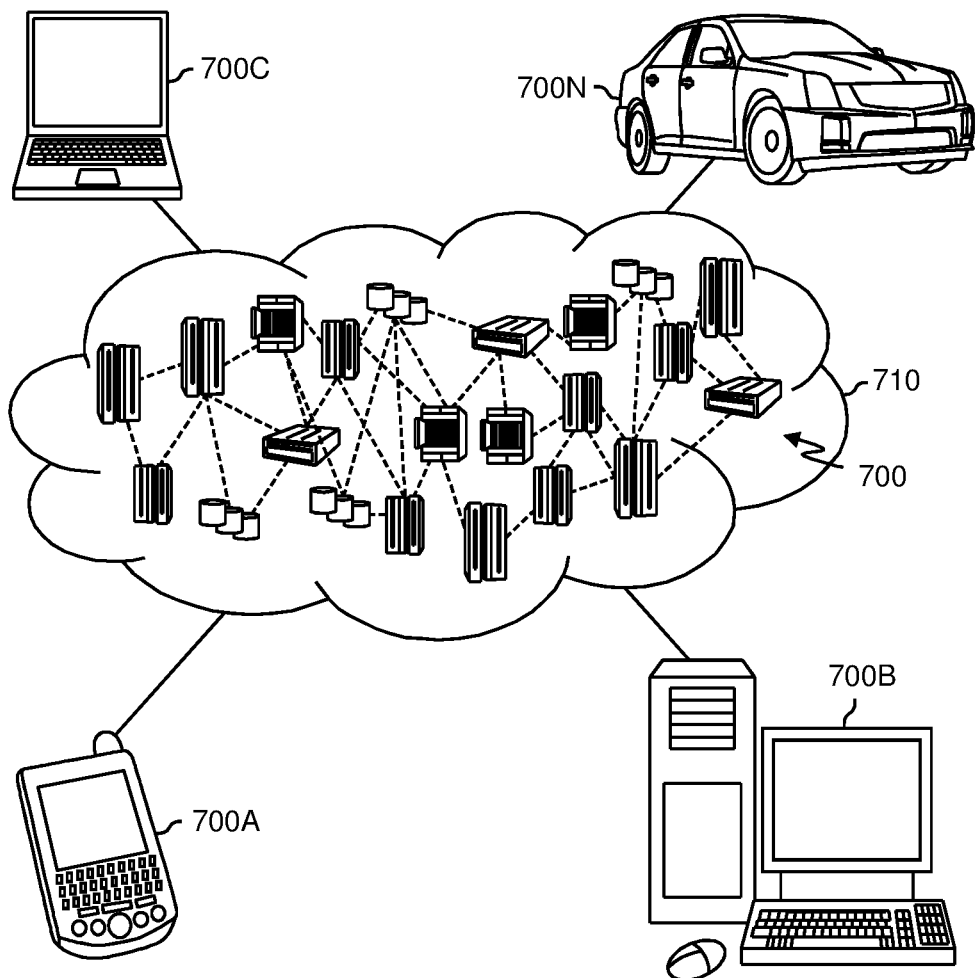
FIG. 7 is a diagram illustrating a cloud computing environment, in accordance with embodiments of the present disclosure.

Referring now to FIG. 7, illustrative cloud computing environment 710 is depicted. As shown, cloud computing environment 710 includes one or more cloud computing nodes 700 with which local computing devices used by cloud consumers, such as, for example, personal digital assistant (PDA) or cellular telephone 700A, desktop computer 700B (e.g., VCD 120, VCD 420, audio output device 550) laptop computer 700C (e.g., VCD 120, VCD 420, audio output device 550), and/or automobile computer system 700N can communicate. Nodes 700 can communicate with one another. They can be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
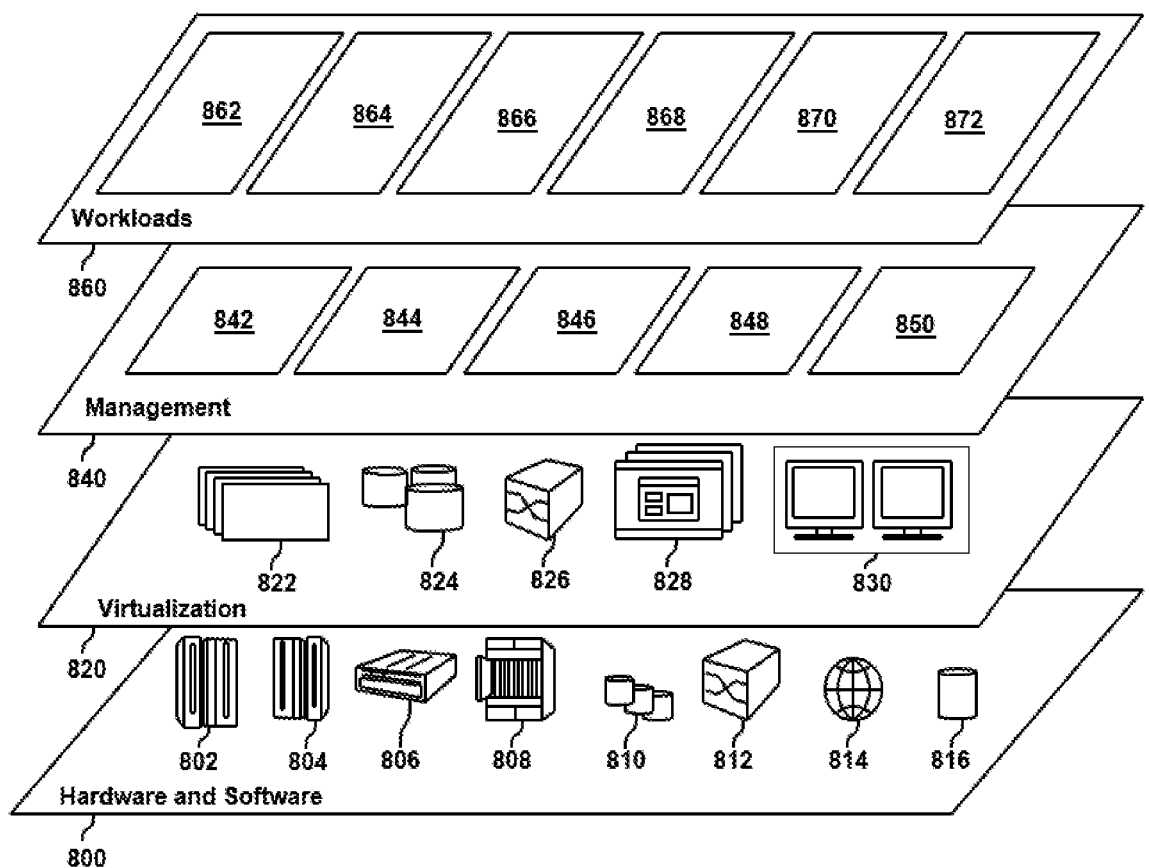
FIG. 8 is a block diagram illustrating abstraction model layers, in accordance with embodiments of the present disclosure.

Referring now to FIG. 8, a set of functional abstraction layers provided by cloud computing environment 710 (FIG. 7) is shown. It should be understood in advance that the components, layers, and functions shown in FIG. 8 are intended to be illustrative only and embodiments of the disclosure are not limited thereto. As depicted below, the following layers and corresponding functions are provided.

Hardware and software layer 800 includes hardware and software components. Examples of hardware components include: mainframes 802; RISC (Reduced Instruction Set Computer) architecture based servers 804; servers 806; blade servers 808; storage devices 810; and networks and networking components 812. In some embodiments, software components include network application server software 814 and database software 816.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 840 can provide the functions described below. Resource provisioning 842 provides dynamic procurement of computing resources and other resources that are utilized to perform tasks within the cloud computing environment. For example, resource provisioning 842 can allocate additional computing resources to devices which are indicated to have high activity. Metering and Pricing 844 provide cost tracking as resources are utilized within the cloud computing environment, and billing or invoicing for consumption of these resources. In one example, these resources can include application software licenses. In some embodiments, Metering and Pricing 844 indicates the number of allotted licenses to machines in the system. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment can be utilized. Examples of workloads and functions which can be provided from this layer include: mapping and navigation 862; software development and lifecycle management 864; virtual classroom education delivery 866; data analytics processing 868; transaction processing 870; and identifying an identifiable media 872.

As discussed in more detail herein, it is contemplated that some or all of the operations of some of the embodiments of methods described herein may be performed in alternative orders or may not be performed at all, insofar as they are consistent herein; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for distinguishing voice commands at a voice command device, comprising:
    accessing one or more stored blocked directions of background voice noise from one or more audio output devices for a location of a voice command device;
    receiving a voice input at the voice command device at the location and determining that the voice input is received from a blocked direction;
    in response to determining that the voice input is received from the blocked direction:
    querying a status of an audio output device to determine whether it is currently emitting audio;
    receiving the status from the audio output device indicating that the audio output device is currently emitting audio;
    obtaining, in response to a determination that the audio output device is currently emitting audio based on the received status, an audio file from the audio output device, the audio file being a formatted audio recording generated at the audio output device corresponding to a time when the voice input was received;
    comparing the obtained audio file with the received voice input; and
    ignoring the received voice input if there is a substantial match with the obtained audio file.

2. The method of claim 1, further comprising:
   querying the status of a plurality of audio output devices in a range of the voice command device to determine which of the plurality of audio output devices are currently emitting audio output;
   obtaining an audio file from each of the audio output devices which were determined to be emitting audio output;
   comparing each of the obtained audio files with the received voice input; and
   ignoring the received voice input if there is a substantial match with at least one of the obtained audio files.

3. The method of claim 1, wherein comparing the obtained audio file with the received voice input includes processing the obtained audio file and the received voice input to convert the audio file and the voice input to text and to represent the text as phonetic strings for comparison.

4. The method of claim 1, wherein the audio file is buffered at the audio output device.

5. The method of claim 1, wherein the audio output device is queried for volume status, wherein the audio output device is determined to be emitting audio by:
   receiving the queried volume status;
   comparing the received volume status to a volume threshold; and
   determining, in response to the received volume status exceeding the volume threshold, that the audio output device is emitting audio.

6. The method of claim 1, wherein the audio output device is queried for power status, wherein the audio output device is determined to be emitting audio in response to the audio output device being powered on.

7. The method of claim 1, wherein the blocked direction is determined via time difference of arrival at two or more microphones within the voice command device.

8. The method of claim 1, wherein determining whether there is a substantial match between the received voice input and audio file is based on at least one threshold.

9. The method of claim 1, wherein the audio file and the voice input are each converted into a text transcript for comparison, wherein the substantial match is determined based on a threshold number of characters matching between the transcript for the audio file and the transcript for the voice input.

10. The method of claim 1, wherein at least one blocked direction of the one or more blocked directions is determined by:
    receiving a plurality of voice inputs from the at least one blocked direction, wherein each of the plurality of voice inputs are received at a distinct time;
    comparing the plurality of received voice inputs to stored command data;
    determining whether each of the plurality of received voice inputs corresponds to the stored command data;
    determining a number of voice inputs of the plurality of voice inputs that do not correspond to the stored command data;
    comparing the number of voice inputs that do not correspond to the stored command data to a non-command voice input threshold; and
    storing, in response to the number of voice inputs that do not correspond to the stored command data exceeding the non-command voice input threshold, the at least one blocked direction with the one or more blocked directions.

11. A system for distinguishing voice commands at a voice command device, comprising:
    a processor;
    at least one memory component;
    a blocked direction accessing component configured to access one or more stored blocked directions of background voice noise from one or more audio output devices for a location of a voice command device;
    a voice input receiver configured to receive a voice input at the voice command device at the location and determine that the voice input is received from a blocked direction;
    a querying component configured to, in response to determining that the voice input is received from the blocked direction, query a status of an audio output device to determine whether it is currently emitting audio output and receive the status from the audio output device indicating that the audio output device is currently emitting audio;
    an audio file obtaining component configured to obtain an audio file from the audio output device in response to a determination that the audio output device is currently emitting audio based on the received status, the audio file being a formatted audio recording generated at the audio output device corresponding to a time when the voice input was received;
    a comparing component configured to compare the obtained audio file with the received voice input; and
    a voice input ignoring component configured to ignore the received voice input if there is a substantial match with the obtained audio file.

12. The system of claim 11, wherein:
    the querying component is configured to query the status of a plurality of audio output devices in a range of the voice command device to determine which of the plurality of audio output devices are currently emitting audio output;
    the audio file obtaining component is configured to obtain an audio file from each of the audio output devices which were determined to be emitting audio output;
    the comparing component is configured to compare each of the obtained audio files with the received voice input; and
    the voice input ignoring component is configured to ignore the received voice input if there is a substantial match with at least one of the obtained audio files.

13. The system of claim 11, wherein comparing the obtained audio file with the received voice input includes processing the obtained audio file and the received voice input to convert the audio file and the voice input to text and to represent the text as phonetic strings for comparison.

14. The system of claim 11, wherein the audio output device is queried for volume status, wherein the audio output device is determined to be emitting audio by:
    receiving the queried volume status;
    comparing the received volume status to a volume threshold; and
    determining, in response to the received volume status exceeding the volume threshold, that the audio output device is emitting audio.

15. The system of claim 11, wherein the blocked direction is determined via triangulation at two or more microphones within the voice command device.

16. The system of claim 11, wherein determining whether there is a substantial match between the received voice input and audio file is based on at least one threshold.

17. The system of claim 11, wherein the audio file and the voice input are each converted into a text transcript for comparison, wherein the substantial match is determined based on a threshold number of words matching between the transcript for the audio file and the transcript for the voice input.

18. The system of claim 11, wherein the audio output device includes an audio output providing component comprising:
    a monitoring component configured to monitor an audio output of the audio output device;
    a buffering component configured to buffer a predefined duration of audio output;
    a status component configured to send a status reply to the querying component of the voice command device to indicate if the audio output device is currently emitting audio output; and
    an audio file transmitting component configured to transmit an audio file to the voice command device if the audio output device is currently emitting audio output, wherein the audio file is a latest buffered audio output from the audio output device.

19. The system of claim 11, wherein at least one blocked direction of the one or more stored blocked directions is determined by:
    receiving a plurality of voice inputs from the at least one blocked direction, wherein each of the plurality of voice inputs are received at a distinct time;
    comparing the plurality of received voice inputs to stored command data;
    determining whether each of the plurality of received voice inputs corresponds to the stored command data;
    determining a number of voice inputs of the plurality of voice inputs that do not correspond to the stored command data;
    comparing the number of voice inputs that do not correspond to the stored command data to a non-command voice input threshold; and
    storing, in response to the number of voice inputs that do not correspond to the stored command data exceeding the non-command voice input threshold, the at least one blocked direction with the one or more blocked directions.

20. A computer program product for distinguishing voice commands at a voice command device, the computer program product comprising a computer readable storage medium having program instructions embodied therewith, the program instructions executable by a processor to cause the processor to perform a method comprising:
    accessing one or more stored blocked directions of background voice noise from one or more audio output devices for a location of a voice command device, wherein a blocked direction of the one or more blocked directions is determined by:
        receiving a plurality of voice inputs from the blocked direction, wherein each of the plurality of voice inputs are received at a distinct time;
        comparing the plurality of received voice inputs to stored command data;
        determining whether each of the plurality of received voice inputs corresponds to the stored command data;
        determining a number of voice inputs of the plurality of voice inputs that do not correspond to the stored command data;
        comparing the number of voice inputs that do not correspond to the stored command data to a non-command voice input threshold; and
        storing, in response to the number of voice inputs that do not correspond to the stored command data exceeding the non-command voice input threshold, the blocked direction with the one or more blocked directions;
    receiving a voice input at the voice command device at the location and determining that the voice input is received from the blocked direction;
    querying a volume status of an audio output device to determine whether it is currently emitting audio, wherein the audio output device is determined to be emitting audio by:
        receiving the queried volume status;
        comparing the received volume status to a volume threshold; and
        determining, in response to the received volume status exceeding the volume threshold, that the audio output device is emitting audio;
    obtaining, in response to a determination that the audio output device is currently emitting audio based on the received volume status, an audio file from the audio output device, the audio file being a formatted audio recording generated at the audio output device corresponding to a time when the voice input was received, wherein the audio file is buffered for a predetermined time interval;
    comparing the obtained audio file with the received voice input by converting the audio file and the voice input each into text transcripts; and
    ignoring the received voice input if there is a substantial match with the obtained audio file, wherein the substantial match is determined based on a threshold number of characters matching between the transcript for the audio file and the transcript for the voice input.

* * * * *